United States Patent
Dean et al.

(10) Patent No.: US 6,954,884 B2
(45) Date of Patent: Oct. 11, 2005

(54) SYSTEM AND METHOD FOR EFFECTING RECOVERY OF A NETWORK

(75) Inventors: Ronnie Elbert Dean, Aurora, IL (US); Keith W. Johnson, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 586 days.

(21) Appl. No.: 09/871,768

(22) Filed: Jun. 1, 2001

(65) Prior Publication Data

US 2002/0184571 A1 Dec. 5, 2002

(51) Int. Cl.[7] .................................................. G06F 11/00
(52) U.S. Cl. .............................. 714/51; 714/55; 714/2; 714/9; 714/38; 714/48
(58) Field of Search .................... 714/2, 9, 38, 48, 714/51, 55

(56) References Cited

U.S. PATENT DOCUMENTS

| | | | |
|---|---|---|---|
| 5,560,033 A | * 9/1996 | Doherty et al. | 713/340 |
| 5,774,660 A | * 6/1998 | Brendel et al. | 709/201 |
| 6,119,244 A | * 9/2000 | Schoenthal et al. | 714/4 |
| 6,266,781 B1 | * 7/2001 | Chung et al. | 714/4 |
| 6,633,538 B1 | * 10/2003 | Tanaka et al. | 370/222 |
| 6,701,449 B1 | * 3/2004 | Davis et al. | 714/4 |

OTHER PUBLICATIONS

Lucent Technologies, Bell Labs Innovations, Reliable Clustered Computing (RCC), 1997.

* cited by examiner

*Primary Examiner*—Scott Baderman
*Assistant Examiner*—Emerson Puente

(57) ABSTRACT

A system for effecting recovery of a network involving a plurality of computing apparatuses with each respective computing apparatus hosting at least one respective service, includes: (a) at least one control unit substantially embodied in hardware and coupled with each computing apparatus; and (b) at least one control program substantially embodied in software and distributed among at least one of the computing apparatuses. The system responds to a computing apparatus becoming inoperative by effecting a recovery operation. The recovery operation includes distributing the services hosted by the inoperative computing apparatus as distributed services among operating computing apparatuses and returning the distributed services to the inoperative computing apparatus after the inoperative computing apparatus becomes operative. The at least one control unit and the at least one control program cooperate to effect the recovery operation.

17 Claims, 13 Drawing Sheets

SYSTEM AND METHOD FOR EFFECTING RECOVERY OF A NETWORK

BACKGROUND OF THE INVENTION

The present invention is directed to networks or clusters of computing apparatuses, and especially to particular aspects of operation of such computer networks, such as recovery from a fault suffered by a member computer of the network. In this context a recovery includes continuity of full-service (or as near to full-service as can be attained under the circumstances) operation of a network of computing apparatuses while repairs are effected, and subsequent restoration of a repaired computing apparatus to participation in service provision for the network. The present invention is useful in operating computer networks in any environment or in any technical application, and is particularly useful in operating computer networks associated with wireless telecommunication system. One skilled in the art of computer network design will recognize that no aspect of the invention limits its employment to telecommunication applications.

Grouping computers into clusters or networks is one method for providing higher levels of availability for computers. Such a connection arrangement provides a structure by which failure of any one of the computers in the network can be compensated for by one or more of the remaining member computers in the network. Management and control of such a cluster of computing apparatuses is carried out by an entity known as a "watchdog". A watchdog can be implemented in hardware or in a set of collaborating software processes or programs. One of the software entities among the set is preferably the primary controller of recovery activities and remaining software entities are secondary or backup controllers configured to assume watchdog operation control in the event the primary software entity fails.

A watchdog implemented in hardware is typically embodied in a single, ultra-low Mean Time Between Failure (MTBF) unit. The unit is usually an autonomous unit in a separate locus in the system, but could as well be included in the cabinetry of one or more of the computing apparatuses in the network. The point is that the hardware watchdog is substantially implemented in hardware and is therefore more robust and reliable than a software implementation. Some software is included to operate the hardware, but sensing inoperative computing apparatuses, switching operations among computing apparatuses, and other activities vital to recovery operations (i.e., continuity and restoration) over which the hardware watchdog has control are implemented and executed in hardware. When the watchdog is substantially implemented in hardware it is typically a much faster entity than is provided by a software watchdog entity. One problem inherent in hardware watchdog entities is that any failure leaves the cluster without centralized control for recovery operations until the failed hardware watchdog unit can be repaired or replaced. During the period the hardware watchdog is being repaired or replaced there is a window of vulnerability during which there is no way for the network to recover from a failure by any other computer in the cluster or network. In such circumstances any service provided by the cluster may be severely and detrimentally affected. One may provide multiple hardware watchdog units to overcome this vulnerability, but that is a complex and costly solution.

Another solution is to provide watchdog protection using a high priority software process having replicas distributed across the cluster of computers. Such an arrangement avoids the catastrophic failure risked with a single hardware watchdog setup, and it avoids most of the complexity and expense of providing additional hardware watchdog units. However, the overall availability among computers is less with a software watchdog implementation than can be provided by a hardware watchdog unit because the software entities commonly exhibit higher failure rates than are exhibited by hardware implementations.

The inventors have developed a two-tier watchdog apparatus and method for effecting recovery of a network of computing apparatuses. According to the preferred embodiment of the invention, a hardware watchdog entity provides primary control of continuity operations (i.e., shifting services from an inoperative computer to operative computers) and recovery operations (i.e., returning services to a computer after it is restored to operation following a failure). In the event that the hardware watchdog unit fails, a set of software watchdog entities assume control of continuity and recovery operations. The two-tier protection provided by the apparatus and method of the present invention is significantly more reliable and provides a more robust computer clustering system than is provided by reliance solely upon a hardware or solely upon software watchdog system.

Typical computer clustering systems can only protect applications from a single point of failure. That is, a hardware watchdog can fail or a computing apparatus in the cluster (i.e., a network processing node) can fail, but if both the hardware watchdog and a network node fail, service will be adversely affected. If a hardware watchdog system fails, there can be no recovery from subsequent node failures until the hardware watchdog unit is replaced or otherwise rendered operational. With the two-tier watchdog apparatus and method of the present invention, a hardware watchdog can fail and (n−1) processing nodes in a network may fail (where n is the number of nodes in the network) and limited service can still be provided using the remaining operational nodes. The capability to provide at least some level of service down to the "last node standing" extends failure coverage and increases overall availability and reliability of a cluster to a significant degree.

There is a need for a watchdog recovery control system for computer cluster networks that is improved in its flexibility over prior art watchdog control systems.

There is a need for a watchdog recovery control system for computer cluster networks that is improved in its robustness over prior art watchdog control systems.

There is a need for a watchdog recovery control system for computer cluster networks that is improved in its reliability over prior art watchdog control systems.

SUMMARY OF THE INVENTION

A system for effecting recovery of a network that involves a plurality of computing apparatuses with each respective computing apparatus of the plurality of computing apparatuses hosting at least one respective service, includes: (a) at least one control unit substantially embodied in hardware and coupled with each respective computing apparatus; and (b) at least one control program substantially embodied in software and distributed among at least one of the computing apparatuses. The system responds to a respective computing apparatus becoming an inoperative computing apparatus by effecting a recovery operation. The recovery operation includes distributing the at least one service hosted by the inoperative computing apparatus as at least one distributed service among operating respective computing apparatuses and returning the at least one distributed service to the inoperative computing apparatus after the inoperative computing apparatus becomes operative. The at least one control unit and the at least one control program cooperate to effect the recovery operation.

It is therefore an object of the present invention to provide an apparatus and method for effecting recovery of a network of computing apparatuses that is improved in its flexibility over prior art recovery control systems.

It is a further object of the present invention to provide an apparatus and method for effecting recovery of a network of computing apparatuses that is improved in its robustness over prior art recovery control systems.

It is still a further object to provide an apparatus and method for effecting recovery of a network of computing apparatuses that is improved in its reliability over prior art watchdog control systems.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
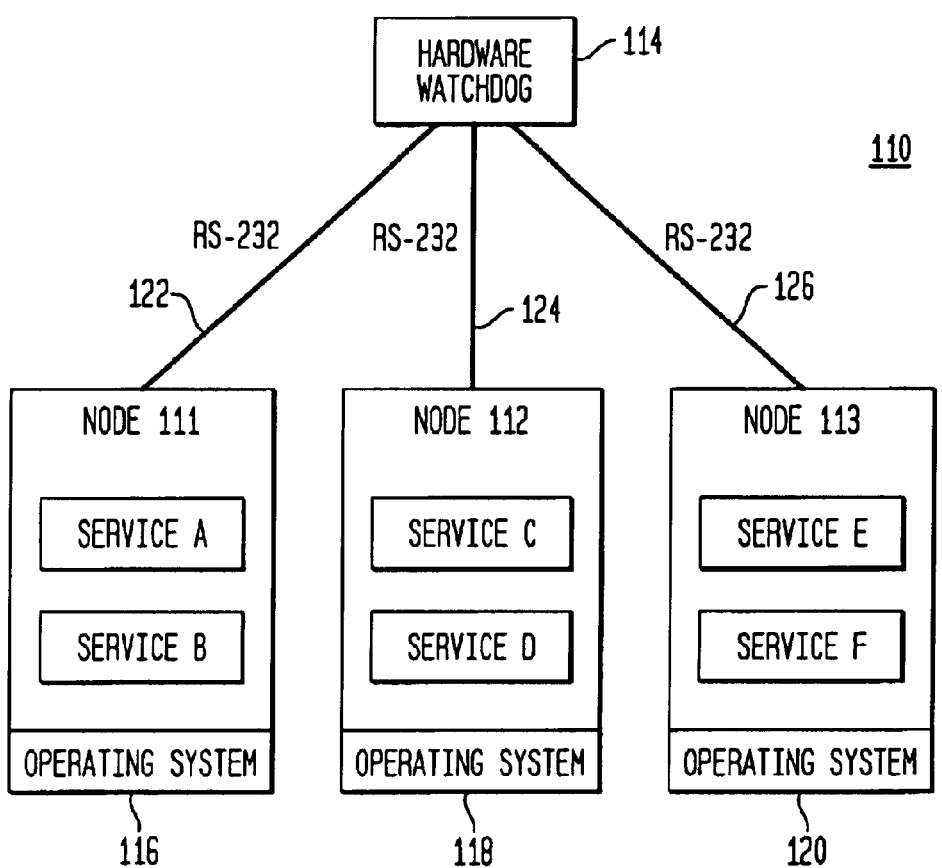
FIG. 1 is a simplified schematic diagram of a hardware watchdog equipped network of computing apparatuses during normal operations.

FIG. 1 is a simplified schematic diagram of a hardware watchdog equipped network of computing apparatuses during normal operations. In FIG. 1, a network system 110 includes processing nodes 111, 112, 113 and a hardware watchdog unit 114. Each respective processing node 111, 112, 113 has its own respective operating system 116, 118, 120. Thus, operating system 116 oversees and directs operational aspects of processing node 111, operating system 118 oversees and directs operational aspects of processing node 112 and operating system 120 oversees and directs operational aspects of processing node 113. There are connections among processing nodes 111, 112, 113 not illustrated in FIG. 1 that are established and used for effecting desired communications, control and other functions for carrying out networking operations. Those various connections are not relevant to the present invention and are not illustrated in FIG. 1 in order to avoid cluttering FIG. 1.

Hardware watchdog unit 114 is coupled with processing nodes 111, 112, 113 via communication interface connections 122, 124, 126. A representative communication interface is denoted in FIG. 1 for interface connections 122, 124, 126: an RS-232 interface. Other interface protocols may be used with equal success in implementing the present invention.

During normal trouble-free operations, as illustrated in FIG. 1, each respective processing node 111, 112, 113 is responsible for providing a particular service suite for network system 110. In FIG. 1, processing node 111 is responsible for providing Service A and Service B for network system 110, processing node 112 is responsible for providing Service C and Service D for network system 110 and processing node 113 is responsible for providing Service E and Service F for network system 110.

Figure 2:
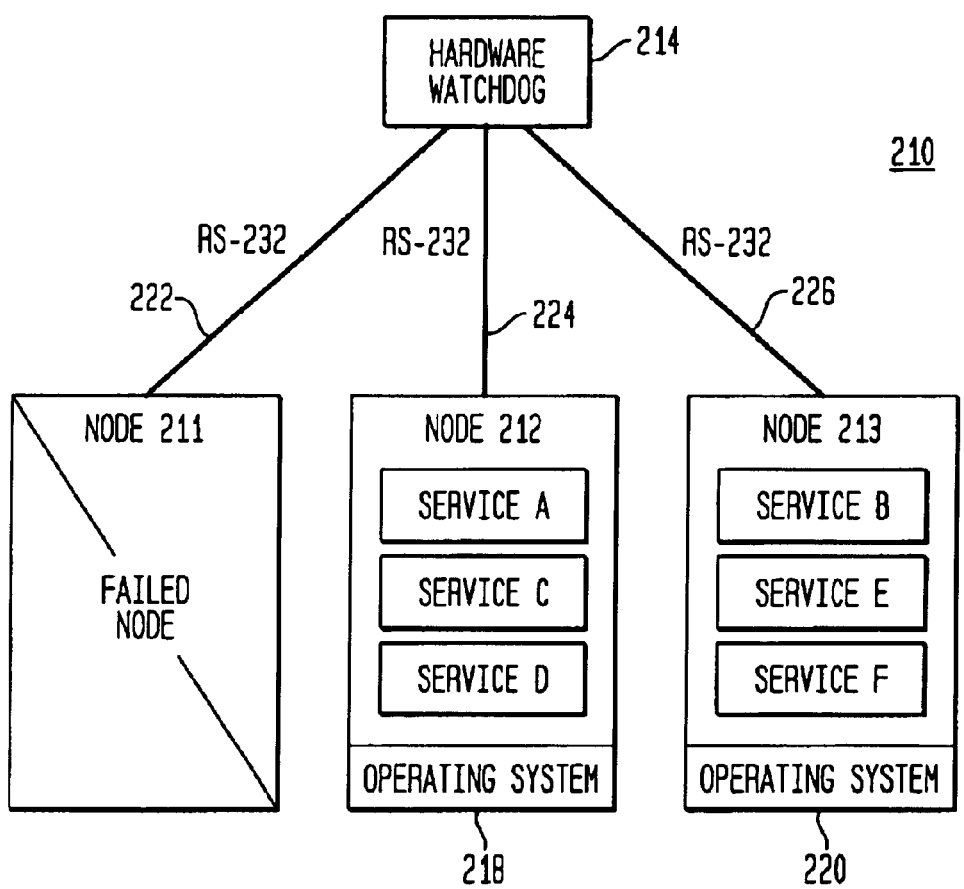
FIG. 2 is a simplified schematic diagram of a hardware watchdog equipped network of computing apparatuses during operations with an inoperative node.

FIG. 2 is a simplified schematic diagram of a hardware watchdog equipped network of computing apparatuses during operations with an inoperative node. In FIG. 2, a network system 210 includes processing nodes 211, 212, 213 and a hardware watchdog unit 214. Processing node 211 is inoperative and therefore unable to participate in network operations within network system 210. Each other operational processing node 212, 213 has its own respective operating system 218, 220. Thus, operating system 218 oversees and directs operational aspects of processing node 212 and operating system 220 oversees and directs operational aspects of processing node 213. There are connections among processing nodes 211, 212, 213 not illustrated in FIG. 2 that are established and used for effecting desired communications, control and other functions for carrying out networking operations. Those various connections are not relevant to the present invention and are not illustrated in FIG. 2 in order to avoid cluttering FIG. 2.

Hardware watchdog unit 214 is coupled with processing nodes 211, 212, 213 via communication interface connections 222, 224, 226. A representative communication interface is denoted in FIG. 2 for interface connections 222, 224, 226: an RS-232 interface. Other interface protocols may be used with equal success in implementing the present invention.

During operations with processing node 211 inoperative, as illustrated in FIG. 2, services provided by processing node 211 during normal operations (Service A and Service B; FIG. 1) must be handled by remaining processing nodes 212, 213 in order to avoid degradation of full-service operations by network system 210.

On sensing that node 211 is inoperative, hardware watchdog unit 214 distributes responsibilities for providing Service A and Service B between processing nodes 212, 213. A representative such distribution is illustrated in FIG. 2 that tasks processing node 212 with providing Service A in addition to its original responsibility for providing Service C and Service D, and tasks processing node 213 with providing Service B in addition to its original responsibility for providing Service E and Service F. The particular manner in which the redistribution of responsibilities for providing services is carried out is a choice that typically may be made by a user or designer of network system 210. An important point is that hardware watchdog unit 214 effects redistribution of responsibilities among remaining operational processing units 212, 213 so that network system 210 continues to be capable of providing all services.

Figure 3:
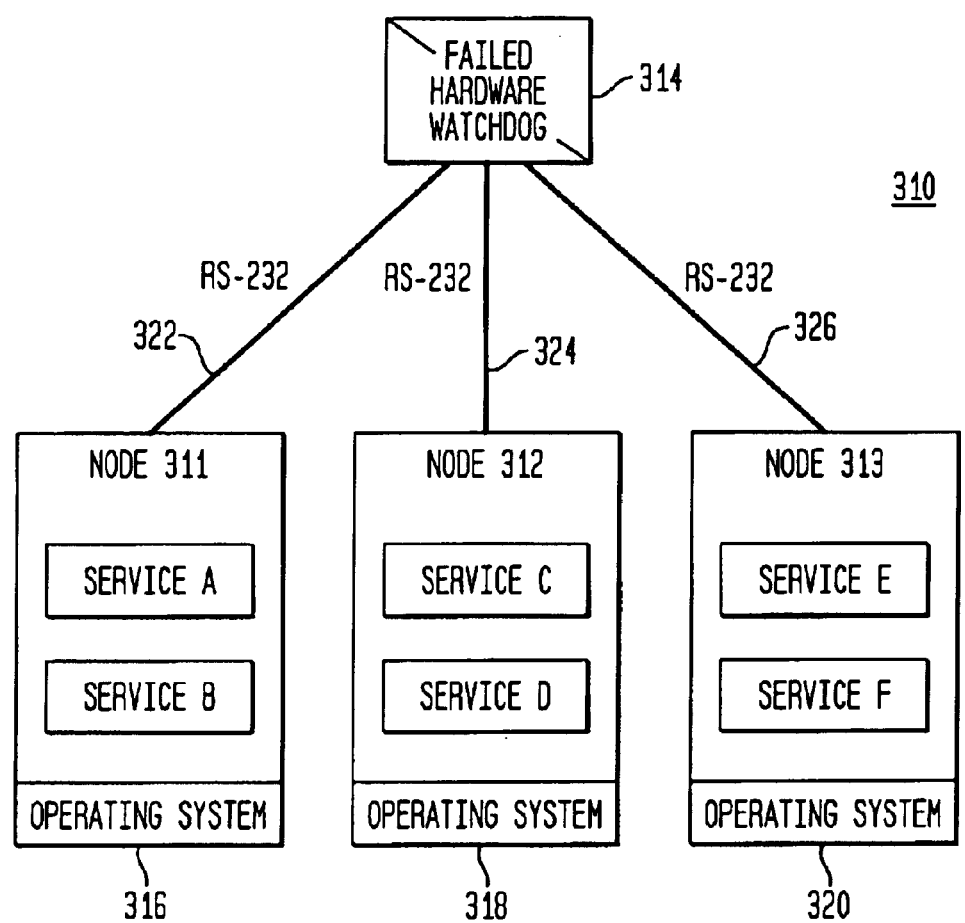
FIG. 3 is a simplified schematic diagram of a hardware watchdog equipped network of computing apparatuses during operations with the hardware watchdog unit inoperative.

FIG. 3 is a simplified schematic diagram of a hardware watchdog equipped network of computing apparatuses during operations with the hardware watchdog unit inoperative. In FIG. 3, a network system 310 includes processing nodes 311, 312, 313 and a hardware watchdog unit 314. Each respective processing node 311, 312, 313 has its own respective operating system 316, 318, 320. Thus, operating system 316 oversees and directs operational aspects of processing node 311, operating system 318 oversees and directs operational aspects of processing node 312 and operating system 320 oversees and directs operational aspects of processing node 313. There are connections among processing nodes 311, 312, 313 not illustrated in FIG. 3 that are established and used for effecting desired communications, control and other functions for carrying out networking operations. Those various connections are not relevant to the present invention and are not illustrated in FIG. 3 in order to avoid cluttering FIG. 3.

Hardware watchdog unit 314 is coupled with processing nodes 311, 312, 313 via communication interface connections 322, 324, 326. A representative communication interface is denoted in FIG. 3 for interface connections 322, 324, 326: an RS-232 interface. Other interface protocols may be used with equal success in implementing the present invention.

During normal trouble-free operations, each respective processing node 311, 312, 313 is responsible for providing a particular service suite for network system 310. Processing node 311 is responsible for providing Service A and Service B for network system 310, processing node 312 is responsible for providing Service C and Service D for network system 310 and processing node 313 is responsible for providing Service E and Service F for network system 310.

In network system 310 hardware watchdog unit 314 is inoperative. During operations with hardware watchdog unit 314 inoperative, as illustrated in FIG. 3, no significant changes to operation of network 310 are necessary so long as each processing node 311, 312, 313 operates normally and network system 310 may provide all services.

Figure 4:
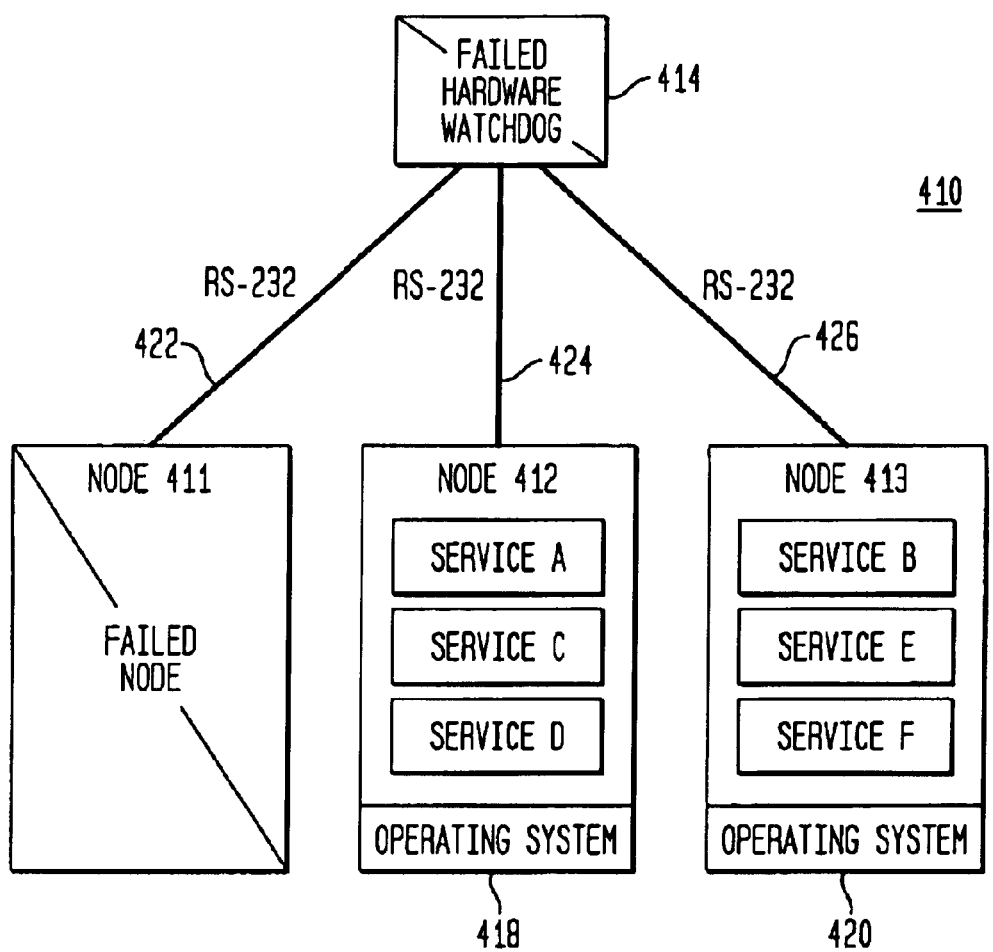
FIG. 4 is a simplified schematic diagram of a hardware watchdog equipped network of computing apparatuses during operations with an inoperative node and with the hardware watchdog unit inoperative.

FIG. 4 is a simplified schematic diagram of a hardware watchdog equipped network of computing apparatuses during operations with an inoperative node and with the hardware watchdog unit inoperative. In FIG. 4, a network system 410 includes processing nodes 411, 412, 413 and a hardware watchdog unit 414. Processing node 411 is inoperative and therefore unable to participate in network operations within network system 410. Each other operational processing node 412, 413 has its own respective operating system 418, 420. Thus, operating system 418 oversees and directs operational aspects of processing node 412 and operating system 420 oversees and directs operational aspects of processing node 413. There are connections among processing nodes 411, 412, 413 not illustrated in FIG. 4 that are established and used for effecting desired communications, control and other functions for carrying out networking operations. Those various connections are not relevant to the present invention and are not illustrated in FIG. 4 in order to avoid cluttering FIG. 4.

Hardware watchdog unit 414 is coupled with processing nodes 411, 412, 413 via communication interface connections 422, 424, 426. A representative communication interface is denoted in FIG. 4 for interface connections 422, 424, 426: an RS-232 interface. Other interface protocols may be used with equal success in implementing the present invention.

During operations with processing node 411 inoperative, services provided by processing node 411 during normal operations (Service A and Service B; FIG. 1) must be handled by remaining processing nodes 412, 413 in order to avoid degradation of full-service operations by network system 410.

In network system 410, on sensing that node 411 was inoperative, watchdog unit 414 distributed responsibilities for providing Service A and Service B between processing nodes 412, 413. After effecting the redistribution of service providing responsibilities between remaining operational processing nodes 412, 413, hardware watchdog unit 414 failed. That situation is illustrated in FIG. 4: failure of hardware watchdog unit 414 after having sensed failure of processing node 412 and redistributing service providing responsibilities for Service A and Service B between remaining operational processing nodes 412, 413.

Network system is still able to provide full-service operations with processing node 412 providing Service A, Service C and Service D; and with processing node 413 providing Service B, Service E and Service F. The particular manner in which the redistribution of responsibilities for providing services is carried out is a choice that typically may be made by a user or designer of network system 410.

Figure 5:
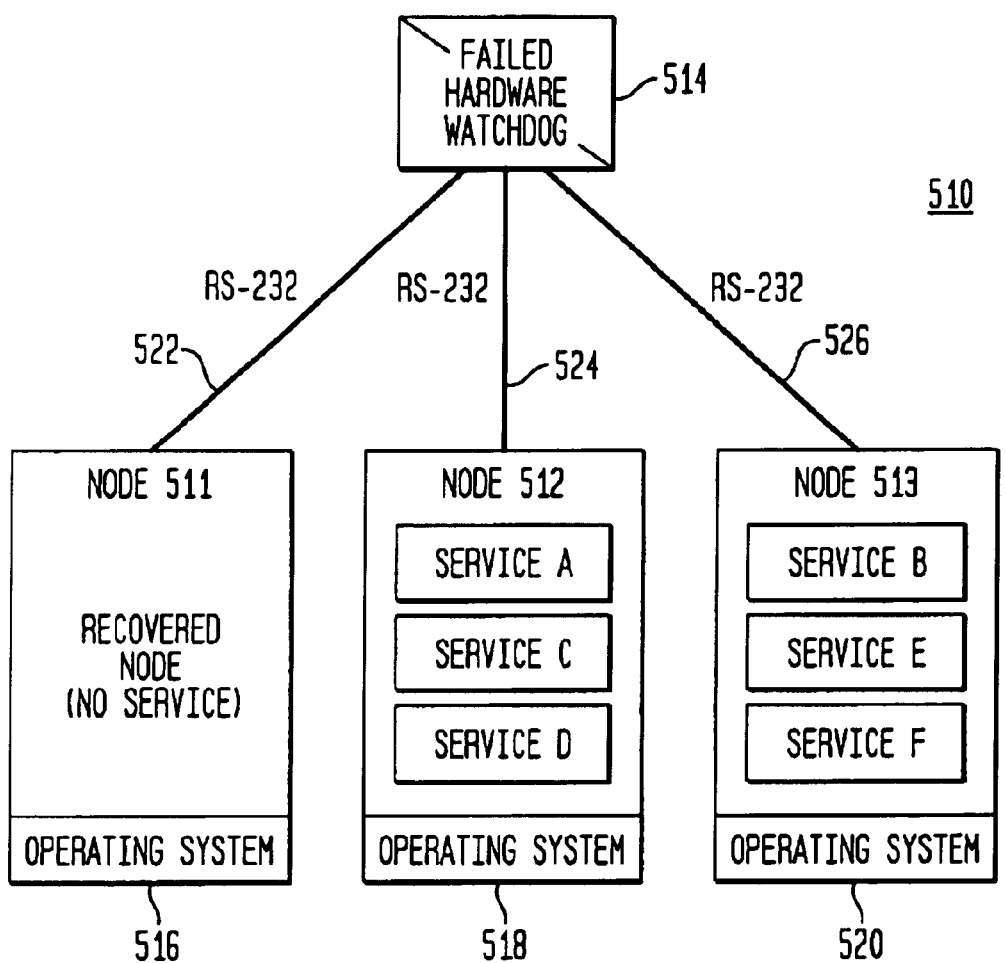
FIG. 5 is a simplified schematic diagram of the hardware watchdog equipped network of computing apparatuses illustrated in FIG. 4 during operations following recovery of the inoperative node.

FIG. 5 is a simplified schematic diagram of the hardware watchdog equipped network of computing apparatuses illustrated in FIG. 4 during operations following recovery of the inoperative node. In FIG. 5, a network system 510 includes processing nodes 511, 512, 513 and a hardware watchdog unit 514. Each processing node 511, 512, 513 has its own respective operating system 516, 518, 520. Thus, operating system 516 oversees and directs operational aspects of processing node 511, operating system 518 oversees and directs operational aspects of processing node 512 and operating system 520 oversees and directs operational aspects of processing node 513. There are connections among processing nodes 511, 512, 513 not illustrated in FIG. 5 that are established and used for effecting desired communications, control and other functions for carrying out networking operations. Those various connections are not relevant to the present invention and are not illustrated in FIG. 5 in order to avoid cluttering FIG. 5.

Hardware watchdog unit 514 is coupled with processing nodes 511, 512, 513 via communication interface connections 522, 524, 526. A representative communication interface is denoted in FIG. 5 for interface connections 522, 524, 526: an RS-232 interface. Other interface protocols may be used with equal success in implementing the present invention.

During earlier operations of network system 510 (described in connection with FIG. 4) processing node 511 failed and watchdog unit 514 distributed responsibilities for providing Service A and Service B between processing nodes 512, 513. After effecting the redistribution of service providing responsibilities between remaining operational processing nodes 512, 513, hardware watchdog unit 514 failed.

Now (FIG. 5) processing unit 511 is restored to operational status and capable of providing services. However, hardware watchdog unit 514 remains inoperative. The consequence of hardware watchdog unit 514 remaining inoperative is that no capability exists within network system 510 to control and effect redistribution of service providing responsibilities among processing nodes 511, 512, 513. The result is that recovered processing node 511 can provide no service. Network system 510 continues to provide full service in its redistributed configuration. However, network system 510 is less robust and more susceptible to degradation of service if another processing node 512, 513 should fail before hardware watchdog unit 514 can be returned to operation and processing unit 511 can be tasked to participate in providing services.

If hardware watchdog unit 514 fails there is a catastrophic failure of network system 510 in so far as network system 510 cannot return to normal operations even after processing node 511 is returned to service. There is a need for more robust and secure network system protection than is provided by a hardware watchdog arrangement alone. As illustrated by FIGS. 1–5, reliance solely upon a hardware watchdog unit for system security and operational recover (i.e., continuity and restoration) exposes one to undesirable risks that a network may be susceptible to increased vulnerability to providing degraded service levels, at least until one can repair or replace a failed hardware watchdog unit.

Figure 6:
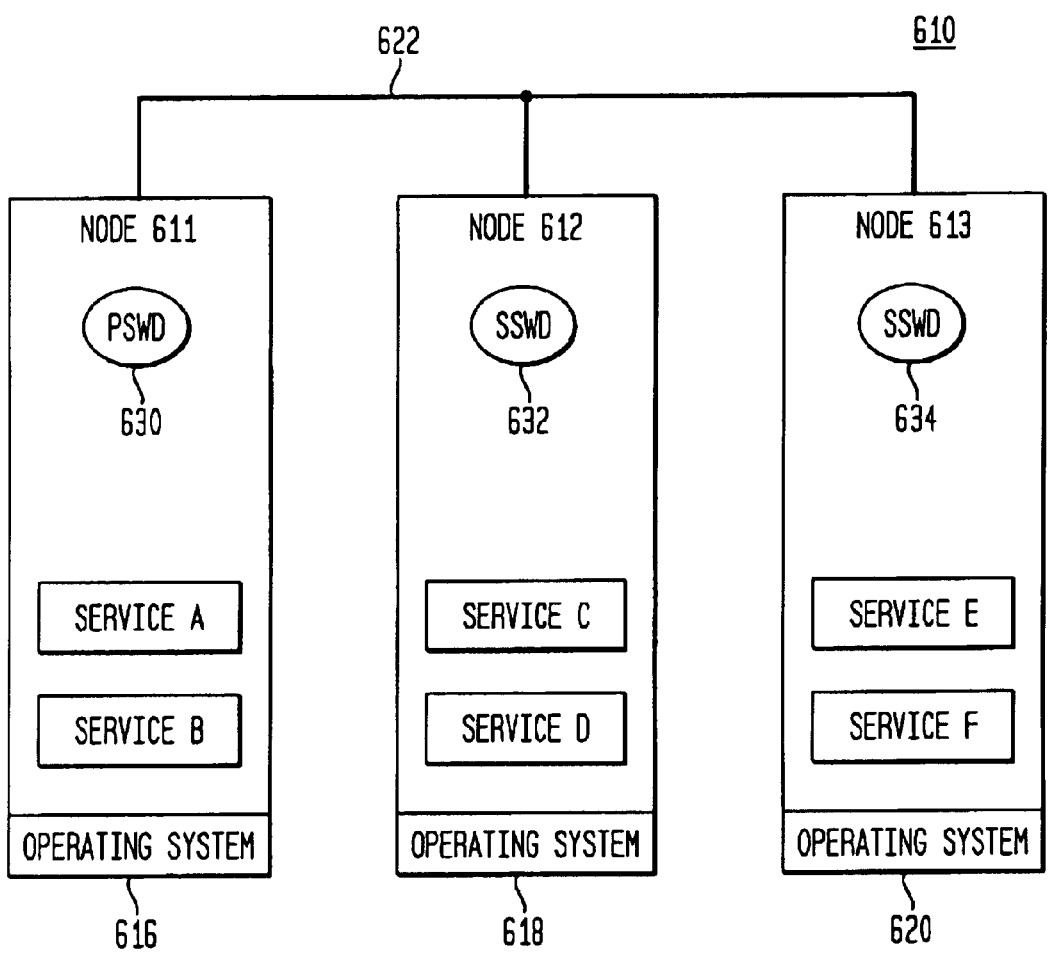
FIG. 6 is a simplified schematic diagram of a software watchdog equipped network of computing apparatuses during normal operations.

FIG. 6 is a simplified schematic diagram of a software watchdog equipped network of computing apparatuses during normal operations. In FIG. 6, a network system 610 includes processing nodes 611, 612, 613. Watchdog functionality is provided by software watchdog units 630, 632, 634. Software watchdog units 630, 632, 634 are substantially similar software packages or programs that are replicated in each of processing nodes 611, 612, 613. One of software watchdog units 630, 632, 634 is designated a primary software watchdog (PSWD), and remaining software watchdog units are designated secondary software watchdog units (SSWD). In network system 610 (FIG. 6), software watchdog unit 630 is designated primary software watchdog PSWD unit 630 and is primarily responsible for watchdog operations in the event of failure of one of processing nodes 611, 612, 613. Software watchdog units 632, 634 are designated secondary software watchdog SSWD units 632, 634 and are tasked with carrying out watchdog responsibilities in the event that primary software watchdog PSWD unit 630 cannot do so. A priority arrangement between secondary software watchdog SSWD units 632, 634 may be established to govern which secondary software watchdog SSWD unit 632, 634 is first to carry out watchdog responsibilities in the event that primary software watchdog PSWD unit 630 is inoperative.

Each respective processing node 611, 612, 613 has its own respective operating system 616, 618, 620. Thus, operating system 616 oversees and directs operational aspects of processing node 611, operating system 618 oversees and directs operational aspects of processing node 612 and operating system 620 oversees and directs operational aspects of processing node 613. There are connections among processing nodes 611, 612, 613 not illustrated in FIG. 6 that are established and used for effecting desired communications, control and other functions for carrying out networking operations. Those various connections are not relevant to the present invention and are not illustrated in FIG. 6 in order to avoid cluttering FIG. 6.

Processing nodes 611, 612, 613 are interconnected for facilitating coordination of watchdog functionality among software watchdog units 630, 632, 634 via communication interface connection 622. No particular representative communication interface is denoted in FIG. 6 for interface connection 622; various interface protocols may be used with equal success in implementing the present invention.

During normal trouble-free operations, as illustrated in FIG. 6, each respective processing node 611, 612, 613 is responsible for providing a particular service suite for network system 610. In FIG. 6, processing node 611 is responsible for providing Service A and Service B for network system 610, processing node 612 is responsible for providing Service C and Service D for network system 610 and processing node 613 is responsible for providing Service E and Service F for network system 610.

Figure 7:
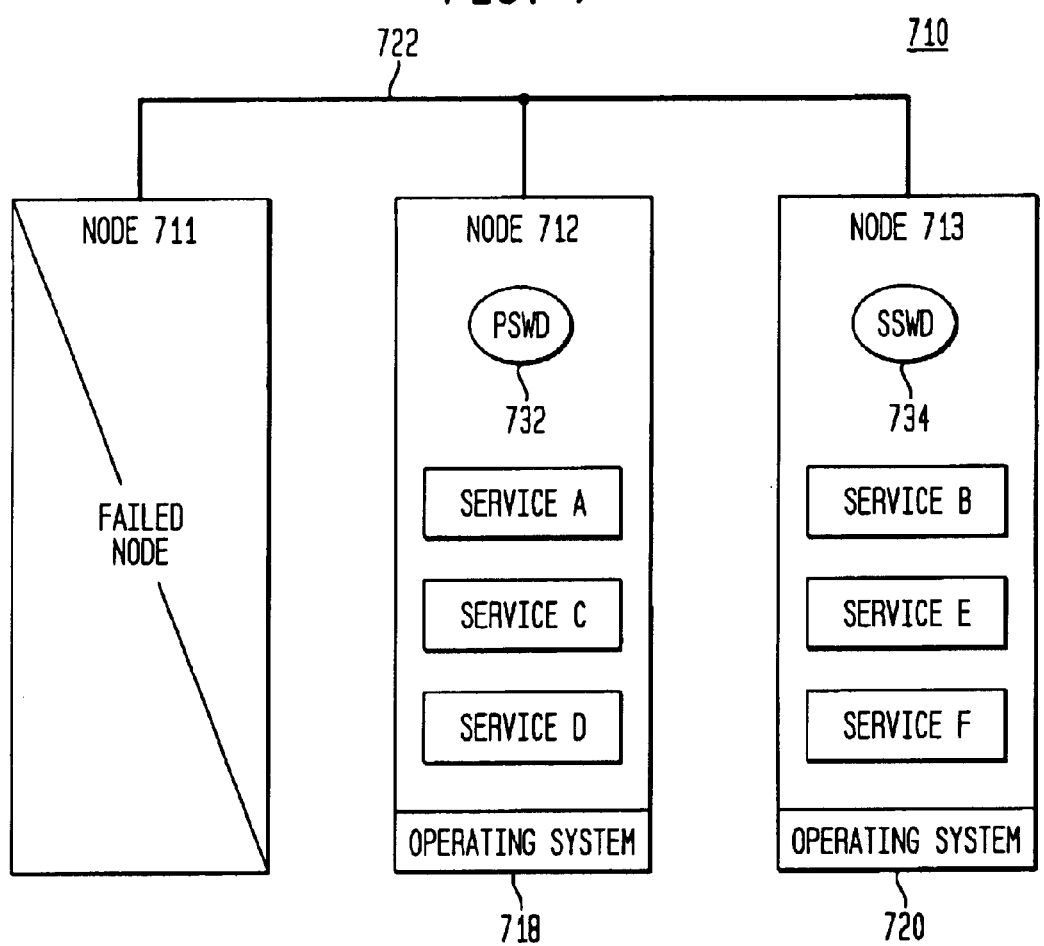
FIG. 7 is a simplified schematic diagram of a software watchdog equipped network of computing apparatuses during operations with an inoperative node.

FIG. 7 is a simplified schematic diagram of a software watchdog equipped network of computing apparatuses during operations with an inoperative node. In FIG. 7, a network system 710 includes processing nodes 711, 712, 713. Processing node 711 is inoperative and therefore unable to participate in providing services for network system 710. Watchdog functionality is provided by software watchdog units 732, 734. Software watchdog units 732, 734 are substantially similar software packages or programs that are replicated in each of processing nodes 712, 713. One of software watchdog units 732, 734 is designated a primary software watchdog (PSWD), and the remaining software watchdog unit of software watchdog units 632, 634 is designated as a secondary software watchdog unit (SSWD). In network system 710 (FIG. 7), software watchdog unit 732 is designated primary software watchdog PSWD unit 732 and is primarily responsible for watchdog operations in the event of failure of one of processing nodes 711, 712, 713. Software watchdog unit 734 is designated secondary software watchdog SSWD unit 734 and is tasked with carrying out watchdog responsibilities in the event that primary software watchdog PSWD unit 732 cannot do so. The software watchdog unit associated with processing node 711 cannot participate in watchdog operations because processing node 711 is inoperative.

A priority arrangement between secondary software watchdog SSWD units 732, 734 may be established to govern which secondary software watchdog SSWD unit 732, 734 is first to carry out watchdog responsibilities in the event that processing node 711 is inoperative and its associated primary software watchdog PSWD unit (e.g., primary software watchdog PSWD unit 630; FIG. 6) is unable to carry out watchdog operations.

Each respective processing node 712, 713 has its own respective operating system 718, 720. Thus, operating system 718 oversees and directs operational aspects of processing node 712 and operating system 720 oversees and directs operational aspects of processing node 713. There are connections among processing nodes 711, 712, 713 not illustrated in FIG. 7 that are established and used for effecting desired communications, control and other functions for carrying out networking operations. Those various connections are not relevant to the present invention and are not illustrated in FIG. 7 in order to avoid cluttering FIG. 7.

Processing nodes 711, 712, 713 are interconnected for facilitating coordination of watchdog functionality among software watchdog units 732, 734 (and whatever software watchdog unit is associated with processing node 711 but is inoperative in FIG. 7) via a communication interface connection 722. No particular representative communication interface is denoted in FIG. 7 for interface connection 722; various interface protocols may be used with equal success in implementing the present invention.

During operations with processing node 711 inoperative, as illustrated in FIG. 7, services provided by processing node 711 during normal operations (Service A and Service B; FIG. 6) must be handled by remaining processing nodes 712, 713 in order to avoid degradation of operations of network system 710.

On sensing that node 711 is inoperative, one of software watchdog units 732, 734 (according to a priority preferably established beforehand) assumes the role of primary software watchdog (PSWD) unit. In FIG. 7, software watchdog unit 732 has assumed the role of primary software watchdog PSWD unit 732 and distributes responsibilities for providing Service A and Service B between processing nodes 712, 713. A representative such distribution is illustrated in FIG. 7 that tasks processing node 712 with providing Service A in addition to its original responsibility for providing Service C and Service D, and tasks processing node 713 with providing Service B in addition to its original responsibility for providing Service E and Service F. The particular manner in which the redistribution of responsibilities for providing services is carried out is a choice that typically may be made by a user or designer of network system 710. An important point is that primary software watchdog PSWD unit 732 effects redistribution of responsibilities among remaining operational processing units 712, 713 so that network system 710 continues to be capable of providing all services.

Figure 8:
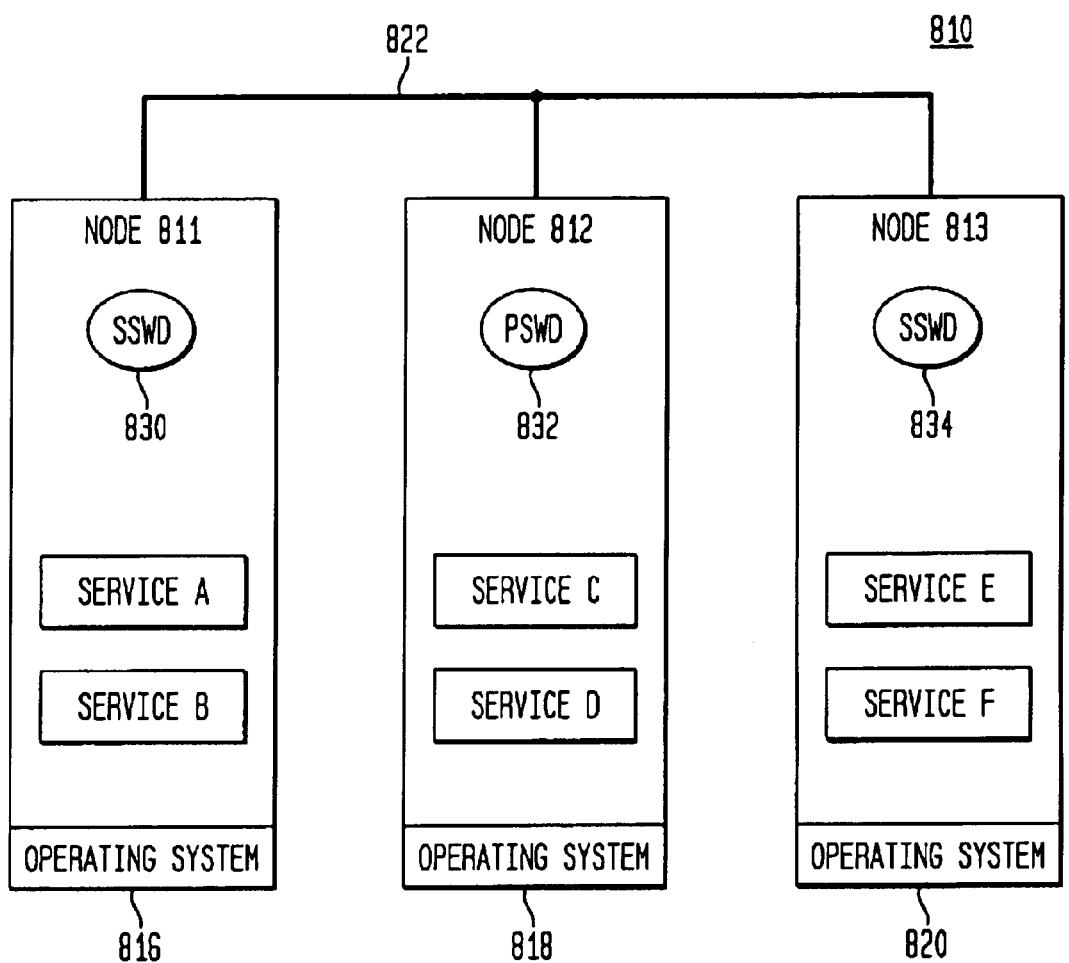
FIG. 8 is a simplified schematic diagram of the software watchdog equipped network of computing apparatuses illustrated in FIG. 7 during operations following recovery of the inoperative node.

FIG. 8 is a simplified schematic diagram of the software watchdog equipped network of computing apparatuses illustrated in FIG. 7 during operations following recovery of the inoperative node. In FIG. 8, a network system 810 includes processing nodes 811, 812, 813. Processing node 811 has been returned to operation from its failed mode (e.g., processing node 711; FIG. 7). Watchdog functionality is provided by software watchdog units 830, 832, 834. Software watchdog units 830, 832, 834 are substantially similar software packages or programs that are replicated in each of processing nodes 811, 812, 813. One of software watchdog units 830, 832, 834 is designated a primary software watchdog (PSWD), and the remaining software watchdog unit of software watchdog units 830, 832, 834 is designated as a secondary software watchdog unit (SSWD). In network system 810 (FIG. 8), since software watchdog unit 832 was designated primary software watchdog PSWD unit 832 during recover from failure of a processing node (e.g., processing node 711; FIG. 7), software watchdog unit 832 remains designated primary software watchdog PSWD unit 832 and is primarily responsible for watchdog operations in the event of any future failure of one of processing nodes 811, 812, 813. Software watchdog units 830, 834 are designated secondary software watchdog SSWD units 830, 834 and are tasked with carrying out watchdog responsibilities in the event that primary software watchdog PSWD unit 832 cannot do so. A priority arrangement between secondary software watchdog SSWD units 830, 834 may be established to govern which secondary software watchdog SSWD unit 830, 834 is first to carry out watchdog responsibilities in the event that primary software watchdog PSWD unit 832 is unable to carry out watchdog operations.

Each respective processing node 811, 812, 813 has its own respective operating system 816, 818, 820. Thus, operating system 816 oversees and directs operational aspects of processing node 811, operating system 818 oversees and directs operational aspects of processing node 812 and operating system 820 oversees and directs operational aspects of processing node 813. There are connections among processing nodes 811, 812, 813 not illustrated in FIG. 8 that are established and used for effecting desired communications, control and other functions for carrying out networking operations. Those various connections are not relevant to the present invention and are not illustrated in FIG. 8 in order to avoid cluttering FIG. 8.

Processing nodes 811, 812, 813 are interconnected for facilitating coordination of watchdog functionality among software watchdog units 830, 832, 834 via a communication interface connection 822. No particular representative communication interface is denoted in FIG. 8 for interface connection 822; various interface protocols may be used with equal success in implementing the present invention.

During earlier operations of network system 810 (described in connection with FIG. 7) processing node 811 failed and newly designated primary software watchdog PSWD unit 832 distributed responsibilities for providing Service A and Service B between processing nodes 812, 813. After the redistribution of service providing responsibilities between remaining operational processing nodes 812, 813 was accomplished, processing node 811 was restored to operation.

Now (FIG. 8) processing unit 811 is capable of providing services. Primary software watchdog PSWD unit 832 effects watchdog operations and redistributes or restores service provision responsibilities among processing nodes 811, 812, 813 to the original service suite alignment illustrated in connection with FIG. 6: processing node 811 provides Service A and Service B; processing node 812 provides Service C and Service D; and processing node 813 provides Service E and Service F. The result is that network system 810 is returned to its original full-service operational configuration.

If any of software watchdog units 830, 832, 834 fails, one of the remaining software watchdog units 830, 832, 834 will be designated as primary software watchdog PSWD unit and carry out redistribution of service provision responsibilities. Moreover, when the failed processing node is restored, a software watchdog unit redistributes service provision responsibilities to the original service provision configuration, or to another configuration if desired. The flexible continuity thus provided by software watchdog units is a desirable feature that contributes to reliability of a network system.

What is needed is a watchdog hardware watchdog capability that enjoys the robustness and speed provided by a hardware watchdog system as well as the flexibility and continuity provided by a software watchdog system. Reliance solely upon either a hardware watchdog unit or a software watchdog system for system security and operational recovery (i.e., continuity and restoration) exposes one to undesirable risks that a network may be susceptible to increased vulnerability to providing degraded service levels.

Figure 9:
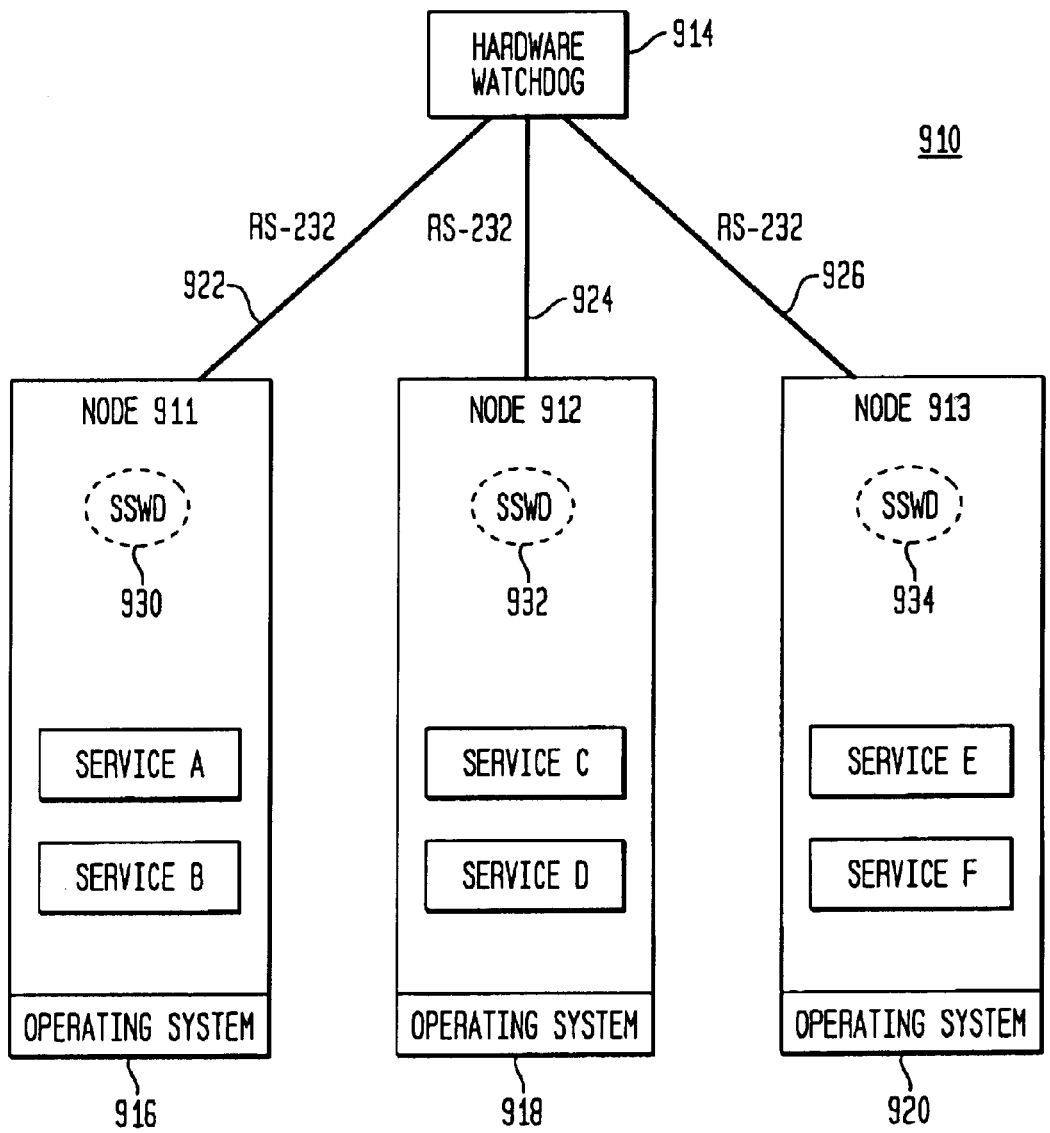
FIG. 9 is a simplified schematic diagram of a network of computing apparatuses that is two-tier watchdog equipped according to the present invention during normal operations.

FIG. 9 is a simplified schematic diagram of a network of computing apparatuses that is two-tier watchdog equipped according to the present invention during normal operations. In FIG. 9, a network system 910 includes processing nodes 911, 912, 913. Watchdog functionality is provided by a hardware watchdog unit 914 and software watchdog units 930, 932, 934. Software watchdog units 930, 932, 934 are substantially similar software packages or programs that are replicated in each of processing nodes 911, 912, 913. One of software watchdog units 930, 932, 934 is designated a primary software watchdog (PSWD), and remaining software watchdog units are designated secondary software watchdog units (SSWD). In network system 910 (FIG. 9), software watchdog unit 930 is designated primary software watchdog PSWD unit 930 and is primarily responsible for watchdog operations in the event of failure of one of processing nodes 911, 912, 913. Software watchdog units 932, 934 are designated secondary software watchdog SSWD units 932, 934 and are tasked with carrying out watchdog responsibilities in the event that primary software watchdog PSWD unit 930 cannot do so. A priority arrangement between secondary software watchdog SSWD units 932, 934 may be established to govern which secondary software watchdog SSWD unit 932, 934 is first to carry out watchdog responsibilities in the event that primary software watchdog PSWD unit 930 is inoperative.

In the two-tier watchdog arrangement (i.e., hardware and software watchdogs) illustrated in FIG. 9, hardware watchdog 914 is preferably employed for first-line watchdog protection and software watchdog units 930, 932, 934 are employed for second-line watchdog protection. This hierarchical arrangement is illustrated in FIG. 9 by software watchdog units 930, 932, 934 being indicated in dotted lines. Other hierarchical arrangements may be established, if desired.

Each respective processing node 911, 912, 913 has its own respective operating system 916, 918, 920. Thus, operating system 916 oversees and directs operational aspects of processing node 911, operating system 918 oversees and directs operational aspects of processing node 912 and operating system 920 oversees and directs operational aspects of processing node 913. There are connections among processing nodes 911, 912, 913 not illustrated in FIG. 9 that are established and used for effecting desired communications, control and other functions for carrying out networking operations. Those various connections are not relevant to the present invention and are not illustrated in FIG. 9 in order to avoid cluttering FIG. 9.

Hardware watchdog unit 914 and software watchdog units 930, 932, 934 are coupled among processing nodes 911, 912, 913 via communication interface connections 922, 924, 926. A representative communication interface is denoted in FIG. 9 for interface connections 922, 924, 926: an RS-232 interface. Other interface protocols, including direct connections among processing nodes 911, 912, 913 (for example, as illustrated in FIGS. 6–8) or combinations of interface protocols and connections may be used with equal success in implementing the present invention.

During normal trouble-free operations, as illustrated in FIG. 9, each respective processing node 911, 912, 913 is responsible for providing a particular service suite for network system 910. In FIG. 9, processing node 911 is responsible for providing Service A and Service B for network system 910, processing node 912 is responsible for providing Service C and Service D for network system 910 and processing node 913 is responsible for providing Service E and Service F for network system 910.

Figure 10:
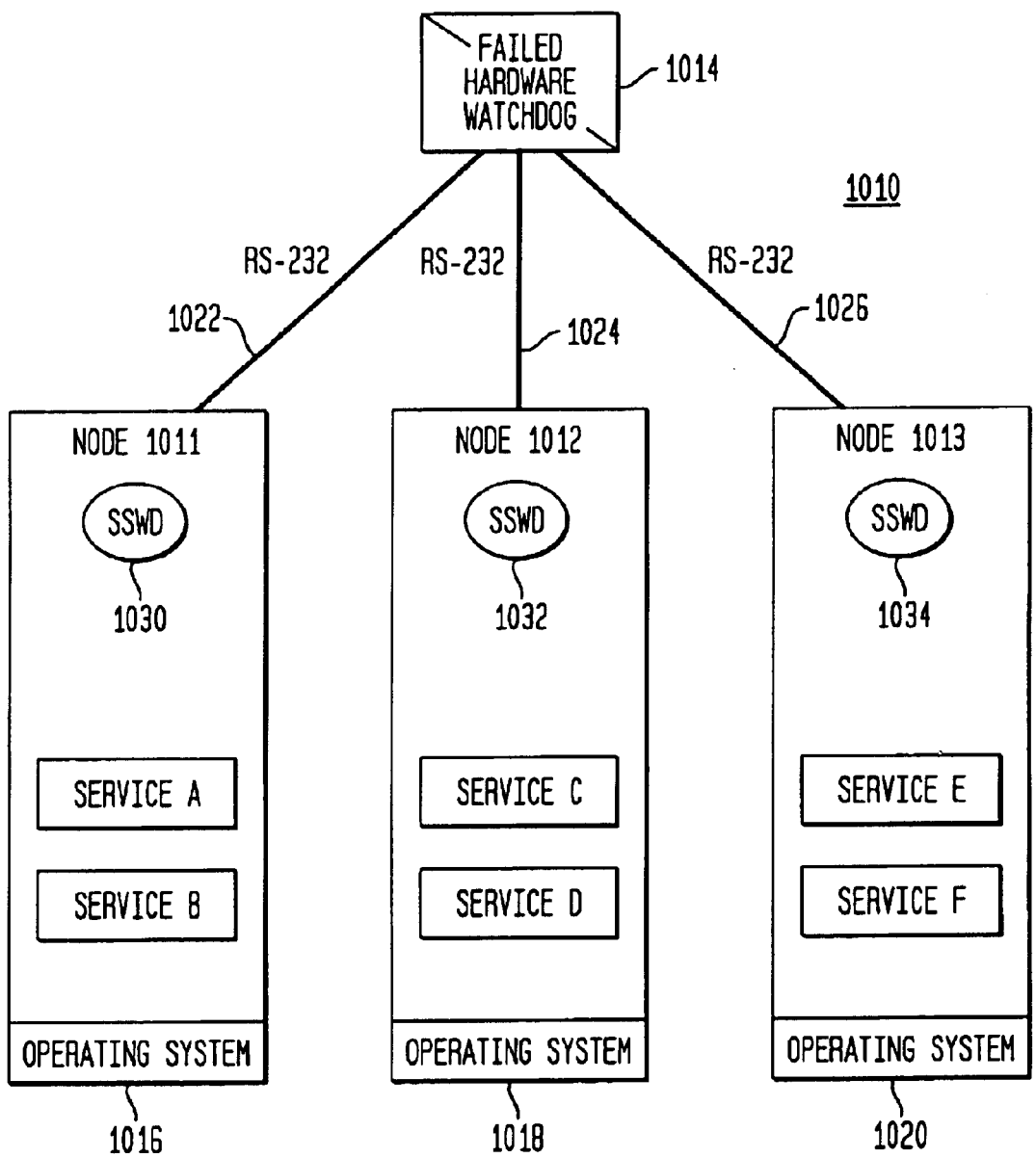
FIG. 10 is a simplified schematic diagram of a network of computing apparatuses that is two-tier watchdog equipped according to the present invention during operations with the hardware watchdog unit inoperative.

FIG. 10 is a simplified schematic diagram of a network of computing apparatuses that is two-tier watchdog equipped according to the present invention during operations with the hardware watchdog unit inoperative. In FIG. 10, a network system 1010 includes processing nodes 1011, 1012, 1013. Watchdog functionality is provided by a hardware watchdog unit 1014 and software watchdog units 1030, 1032, 1034. Software watchdog units 1030, 1032, 1034 are substantially similar software packages or programs that are replicated in each of processing nodes 1011, 1012, 1013. One of software watchdog units 1030, 1032, 1034 is designated a primary software watchdog (PSWD), and remaining software watchdog units are designated secondary software watchdog units (SSWD). In network system 1010 (FIG. 10), software watchdog unit 1030 is designated primary software watchdog PSWD unit 1030 and is primarily responsible for watchdog operations in the event of failure of one of processing nodes 1011, 1012, 1013. Software watchdog units 1032, 1034 are designated secondary software watchdog SSWD units 1032, 1034 and are tasked with carrying out watchdog responsibilities in the event that primary software watchdog PSWD unit 1030 cannot do so. A priority arrangement between secondary software watchdog units SSWD units 1032, 1034 may be established to govern which secondary software watchdog units SSWD unit 1032, 1034 is first to carry out watchdog responsibilities in the event that primary software watchdog PSWD unit 1030 is inoperative.

In the two-tier watchdog arrangement (i.e., hardware and software watchdogs) illustrated in FIG. 10, hardware watchdog 1014 is employed for first-line watchdog protection and software watchdog units 1030, 1032, 1034 are employed for second-line watchdog protection.

Each respective processing node 1011, 1012, 1013 has its own respective operating system 1016, 1018, 1020. Thus, operating system 1016 oversees and directs operational aspects of processing node 1011, operating system 1018 oversees and directs operational aspects of processing node 1012 and operating system 1020 oversees and directs operational aspects of processing node 1013. There are connections among processing nodes 1011, 1012, 1013 not illustrated in FIG. 10 that are established and used for effecting desired communications, control and other functions for carrying out networking operations. Those various connections are not relevant to the present invention and are not illustrated in FIG. 10 in order to avoid cluttering FIG. 10.

Hardware watchdog unit 1014 is coupled with processing nodes 1011, 1012, 1013 via communication interface connections 1022, 1024, 1026. A representative communication interface is denoted in FIG. 10 for interface connections 1022, 1024, 1026: an RS-232 interface. Other interface protocols may be used with equal success in implementing the present invention.

During normal trouble-free operations, each respective processing node 1011, 1012, 1013 is responsible for providing a particular service suite for network system 1010. Processing node 1011 is responsible for providing Service A and Service B for network system 1010, processing node 1012 is responsible for providing Service C and Service D for network system 1010 and processing node 1013 is responsible for providing Service E and Service F for network system 1010.

In network system 1010 hardware watchdog unit 1014 is inoperative. During operations with hardware watchdog unit 1014 inoperative, as illustrated in FIG. 10, no significant changes to operation of network 1010 are necessary so long as each processing node 1011, 1012, 1013 operates normally and network system 1010 may provide all services. More important, there is no risk of system degradation in the event of failure of one of processing nodes 1011, 1012, 1013 with hardware watchdog unit 1014 inoperative. The hierarchical arrangement among hardware watchdog unit 1014 and software watchdog units 1030, 1032, 1034 renders software watchdog units 1030, 1032, 1034 primarily responsible for watchdog operation oversight when hardware watchdog unit 1014 is inoperative. To illustrate their first line responsibility for recovery operations because hardware watchdog unit 1014 is inoperative, software watchdog units 1030, 1032, 1034 are indicated in solid lines in FIG. 10. Thus, there is full watchdog functionality in network system 1010 even when hardware watchdog unit 1014 is inoperative. The watchdog functionality provided by software watchdog units 1030, 1032, 1034 is typically less speedy and less robust than the watchdog functionality provided by hardware watchdog unit 1014. Nevertheless there is a presence of watchdog functionality in network system 1010 using the two-tier watchdog system of the present invention rather than relying solely upon a hardware solution or solely upon a software solution for providing watchdog functionality.

Figure 11:
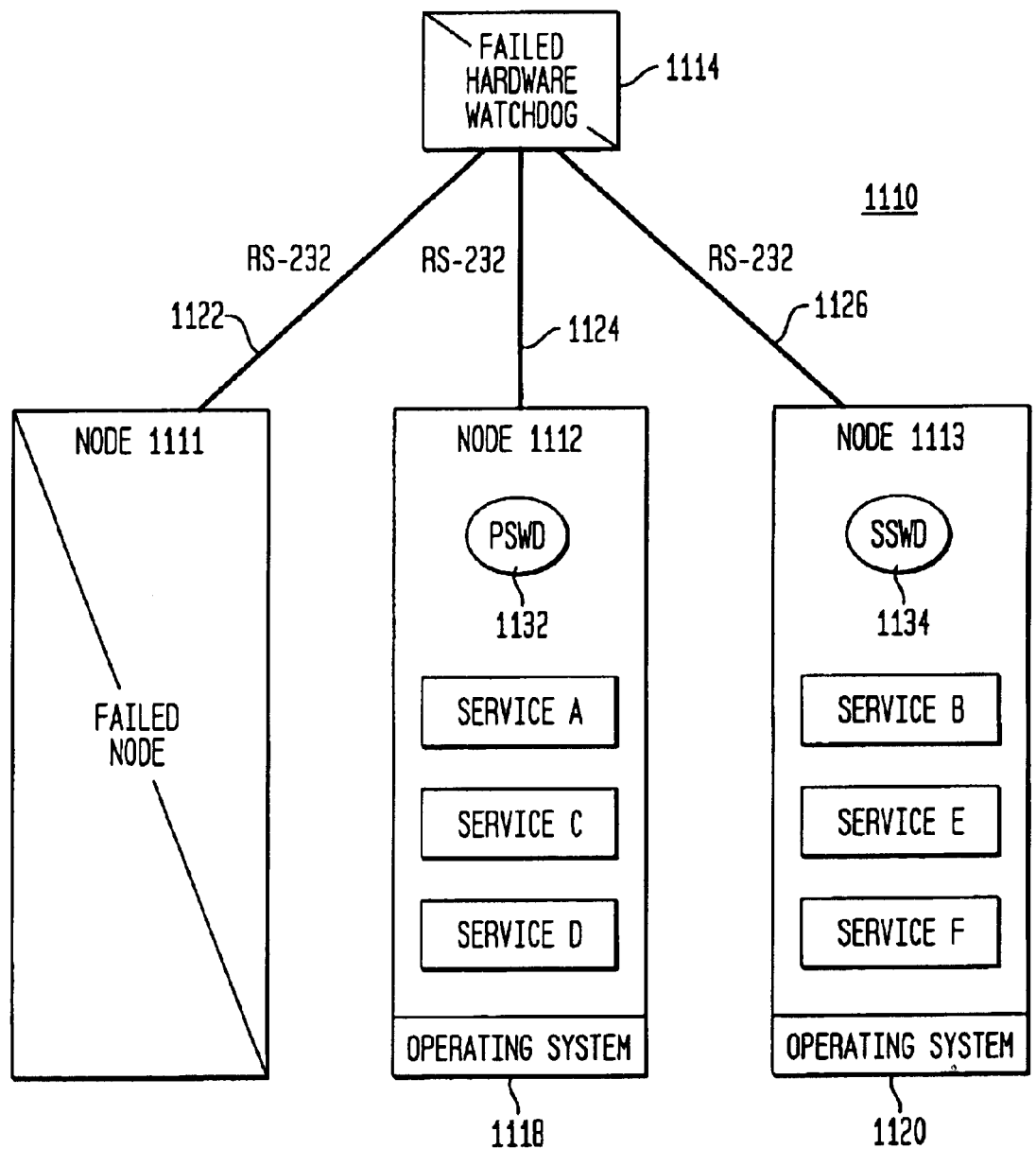
FIG. 11 is a simplified schematic diagram of a network of computing apparatuses that is two-tier watchdog equipped according to the present invention during operations with an inoperative node and with the hardware watchdog unit inoperative.

FIG. 11 is a simplified schematic diagram of a network of computing apparatuses that is two-tier watchdog equipped according to the present invention during operations with an inoperative node and with the hardware watchdog unit inoperative. In FIG. 11, a network system 1110 includes processing nodes 1111, 1112, 1113. Processing node 1111 is inoperative and therefore unable to participate in providing services for network system 1110.

Watchdog functionality is provided by a hardware watchdog unit 1114 and software watchdog units 1132, 1134. Software watchdog units 1132, 1134 are substantially similar software packages or programs that are replicated in each of processing nodes 1112, 1113. One of software watchdog units 1132, 1134 is designated a primary software watchdog (PSWD), and the remaining software watchdog unit of software watchdog units 632, 634 is designated as a secondary software watchdog unit (SSWD). In network system 1110 (FIG. 11), software watchdog unit 1132 is designated primary software watchdog PSWD unit 1132 and is primarily responsible for watchdog operations in the event of failure of one of processing nodes 1111, 1112, 1113. Software watchdog unit 1134 is designated secondary software watchdog SSWD unit 1134 and is tasked with carrying out watchdog responsibilities in the event that primary software watchdog PSWD unit 1132 cannot do so. The software watchdog unit associated with processing node 1111 cannot participate in watchdog operations because processing node 1111 is inoperative.

A priority arrangement between software watchdog units 1132, 1134 may be established to govern which software watchdog unit 1132, 1134 is first to carry out watchdog responsibilities in the event that processing node 1111 is inoperative and its associated primary software watchdog PSWD unit (e.g., primary software watchdog PSWD unit 1030; FIG. 10) is unable to carry out watchdog operations.

In the two-tier watchdog arrangement (i.e., hardware and software watchdogs) illustrated in FIG. 11, hardware watchdog 1114 is employed for first-line watchdog protection and software watchdog units 1130, 1132, 1134 are employed for second-line watchdog protection.

Each respective processing node 1112, 1113 has its own respective operating system 1118, 1120. Thus, operating system 1118 oversees and directs operational aspects of processing node 1112 and operating system 1120 oversees and directs operational aspects of processing node 1113.

There are connections among processing nodes 1111, 1112, 1113 not illustrated in FIG. 11 that are established and used for effecting desired communications, control and other functions for carrying out networking operations. Those various connections are not relevant to the present invention and are not illustrated in FIG. 11 in order to avoid cluttering FIG. 11.

Hardware watchdog unit 1114 is coupled with processing nodes 1111, 1112, 1113 via communication interface connections 1122, 1124, 1126. A representative communication interface is denoted in FIG. 11 for interface connections 1122, 1124, 1126: an RS-232 interface. Other interface protocols may be used with equal success in implementing the present invention.

Processing nodes 1111, 1112, 1113 are interconnected for facilitating coordination of watchdog functionality among software watchdog units 1132, 1134 (and whatever software watchdog unit is associated with processing node 1111 but is inoperative in FIG. 11) via a communication interface connection. No particular representative communication interface is denoted in FIG. 11; the required interface connection may be established using communication interface 1122, 1124, 1126 that couples hardware watchdog unit 1114 with processing nodes 1111, 1112, 1113. Various interface protocols may be used with equal success in implementing the present invention.

In network system 1110 hardware watchdog unit 1114 is inoperative. During operations with hardware watchdog unit 1114 and processing node 1111 inoperative, as illustrated in FIG. 11, services provided by processing node 1111 during normal operations (Service A and Service B; FIG. 10) must be handled by remaining processing nodes 1112, 1113 in order to avoid degradation of operations of network system 1110.

When hardware watchdog unit 1114 is out of service, the hierarchical arrangement established for watchdog operations of network system 1110 provides that software watchdog units 1132, 1134 (and whatever software watchdog unit is associated with processing node 1111 but is inoperative in FIG. 11) control watchdog functionality for network system 1110. On sensing that node 1111 is inoperative, one of software watchdog units 1132, 1134 (according to a priority preferably established beforehand) assumes the role of primary software watchdog (PSWD) unit. In FIG. 11, software watchdog unit 1132 has assumed the role of primary software watchdog PSWD unit 1132 and distributes responsibilities for providing Service A and Service B between processing nodes 1112, 1113. A representative such distribution is illustrated in FIG. 11 that tasks processing node 1112 with providing Service A in addition to its original responsibility for providing Service C and Service D, and tasks processing node 1113 with providing Service B in addition to its original responsibility for providing Service E and Service F. The particular manner in which the redistribution of responsibilities for providing services is carried out is a choice that typically may be made by a user or designer of network system 1110. An important point is that primary software watchdog PSWD unit 1132 effects redistribution of responsibilities among remaining operative processing units 1112, 1113 so that network system 1110 continues to be capable of providing all services.

During operations with hardware watchdog unit 1114 inoperative, as illustrated in FIG. 11, there is no significant increased risk of system degradation in the event of failure of one of processing nodes 1111, 1112, 1113. The hierarchical arrangement among hardware watchdog unit 1114 and software watchdog units 1132, 1134 (and whatever software watchdog unit is associated with processing node 1111 but is inoperative in FIG. 11) renders software watchdog units 1132, 1134 primarily responsible for watchdog operation oversight when hardware watchdog unit 1114 is inoperative. To illustrate their first line responsibility for recovery operations because hardware watchdog unit 1114 is inoperative, software watchdog units 1132, 1134 are indicated in solid lines in FIG. 11. Thus, there is full watchdog functionality in network system 1110 even when hardware watchdog unit 1114 is inoperative. The watchdog functionality provided by software watchdog units 1132, 1134 is typically less speedy and less robust than the watchdog functionality provided by hardware watchdog unit 1114. Nevertheless there is a presence of watchdog functionality in network system 1110 using the two-tier watchdog system of the present invention rather than relying solely upon a hardware solution or solely upon a software solution for providing watchdog functionality.

Figure 12:
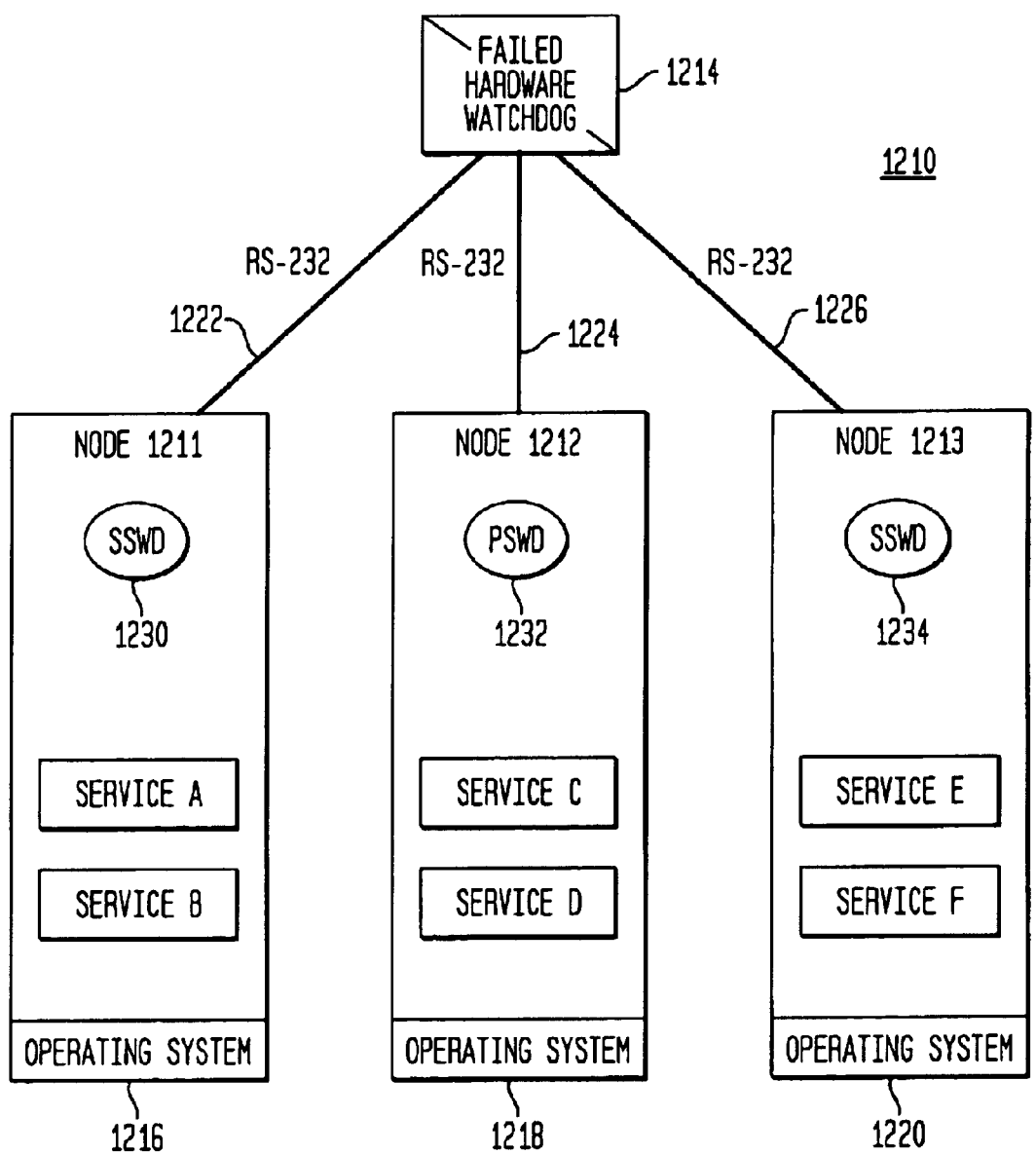
FIG. 12 is a simplified schematic diagram of the network of computing apparatuses that is two-tier watchdog equipped according to the present invention as illustrated in FIG. 11 during operations following recovery of the inoperative node.

FIG. 12 is a simplified schematic diagram of the network of computing apparatuses that is two-tier watchdog equipped according to the present invention as illustrated in FIG. 11 during operations following recovery of the inoperative node. In FIG. 12, a network system 1210 includes processing nodes 1211, 1212, 1213. Processing node 1211 has been returned to operation from its failed mode (e.g., processing node 1111; FIG. 11).

Watchdog functionality is provided by a hardware watchdog unit 1214 and software watchdog units 1230, 1232, 1234. Software watchdog units 1230, 1232, 1234 are substantially similar software packages or programs that are replicated in each of processing nodes 1211, 1212, 1213. In network system 1210 (FIG. 12), since software watchdog unit 1232 was designated primary software watchdog PSWD unit 1232 during recovery from failure of a processing node (e.g., processing node 1111; FIG. 11), software watchdog unit 1232 remains designated primary software watchdog PSWD unit 1232 and is primarily responsible for watchdog operations in the event of any future failure of one of processing nodes 1211, 1212, 1213. Software watchdog units 1230, 1234 are designated secondary software watchdog SSWD units 1230, 1234 and are tasked with carrying out watchdog responsibilities in the event that primary software watchdog PSWD unit 1232 cannot do so.

A priority arrangement among software watchdog units 1230, 1232, 1234 may be established to govern which software watchdog unit 1230, 1232, 1234 is first to carry out watchdog responsibilities in the event that processing node 1211 is restored to operation and its associated software watchdog unit 1230 is again able to carry out watchdog operations.

In the two-tier watchdog arrangement (i.e., hardware and software watchdogs) illustrated in FIG. 12, hardware watchdog 1214 is employed for first-line watchdog protection and software watchdog units 1230, 1232, 1234 are employed for second-line watchdog protection.

Each respective processing node 1211, 1212, 1213 has its own respective operating system 1216, 1218, 1220. Thus, operating system 1216 oversees and directs operational aspects of processing node 1211, operating system 1218 oversees and directs operational aspects of processing node 1212 and operating system 1220 oversees and directs operational aspects of processing node 1213.

There are connections among processing nodes 1211, 1212, 1213 not illustrated in FIG. 12 that are established and used for effecting desired communications, control and other functions for carrying out networking operations. Those various connections are not relevant to the present invention and are not illustrated in FIG. 12 in order to avoid cluttering FIG. 12.

Hardware watchdog unit 1214 is coupled with processing nodes 1211, 1212, 1213 via communication interface connections 1222, 1224, 1226. A representative communication interface is denoted in FIG. 12 for communication interface connections 1222, 1224, 1226: an RS-232 interface. Other interface protocols may be used with equal success in implementing the present invention.

Processing nodes 1211, 1212, 1213 are interconnected for facilitating coordination of watchdog functionality among software watchdog units 1230, 1232, 1234 via a communication interface connection. No particular representative communication interface is denoted in FIG. 12; the required interface connection may be established using communication interface connections 1222, 1224, 1226 that couple hardware watchdog unit 1214 with processing nodes 1211, 1212, 1213. Various interface protocols may be used with equal success in implementing the present invention.

During earlier operations of network system 1210 (described in connection with FIG. 11) processing node 1211 failed and newly designated primary software watchdog PSWD unit 1232 distributed responsibilities for providing Service A and Service B between processing nodes 1212, 1213. After the redistribution of service providing responsibilities between remaining operational processing nodes 1212, 1213 was accomplished, processing node 1211 was restored to operation.

Now (FIG. 12) processing unit 1211 is capable of providing services. Primary software watchdog PSWD unit 1232 effects watchdog operations and redistributes service provision responsibilities among processing nodes 1211, 1212, 1213 to the original service suite alignment illustrated in connection with FIG. 10: processing node 1211 provides Service A and Service B; processing node 1212 provides Service C and Service D; and processing node 1213 provides Service E and Service F. The result is that network system 1210 is returned to its original full-service operational configuration, albeit with hardware watchdog unit 1214 still out of service.

If any of software watchdog units 1230, 1232, 1234 fails, one of the remaining software watchdog units 1230, 1232, 1234 will be designated primary software watchdog PSWD unit and carry out redistribution of service provision responsibilities. Moreover, when the failed processing node is restored, a software watchdog unit redistributes service provision responsibilities to the original service provision configuration, or to another configuration if desired. The continuity thus provided by software watchdog units is a desirable feature that contributes to reliability of a two-tiered watchdog network system constructed according to the present invention.

Figure 13:
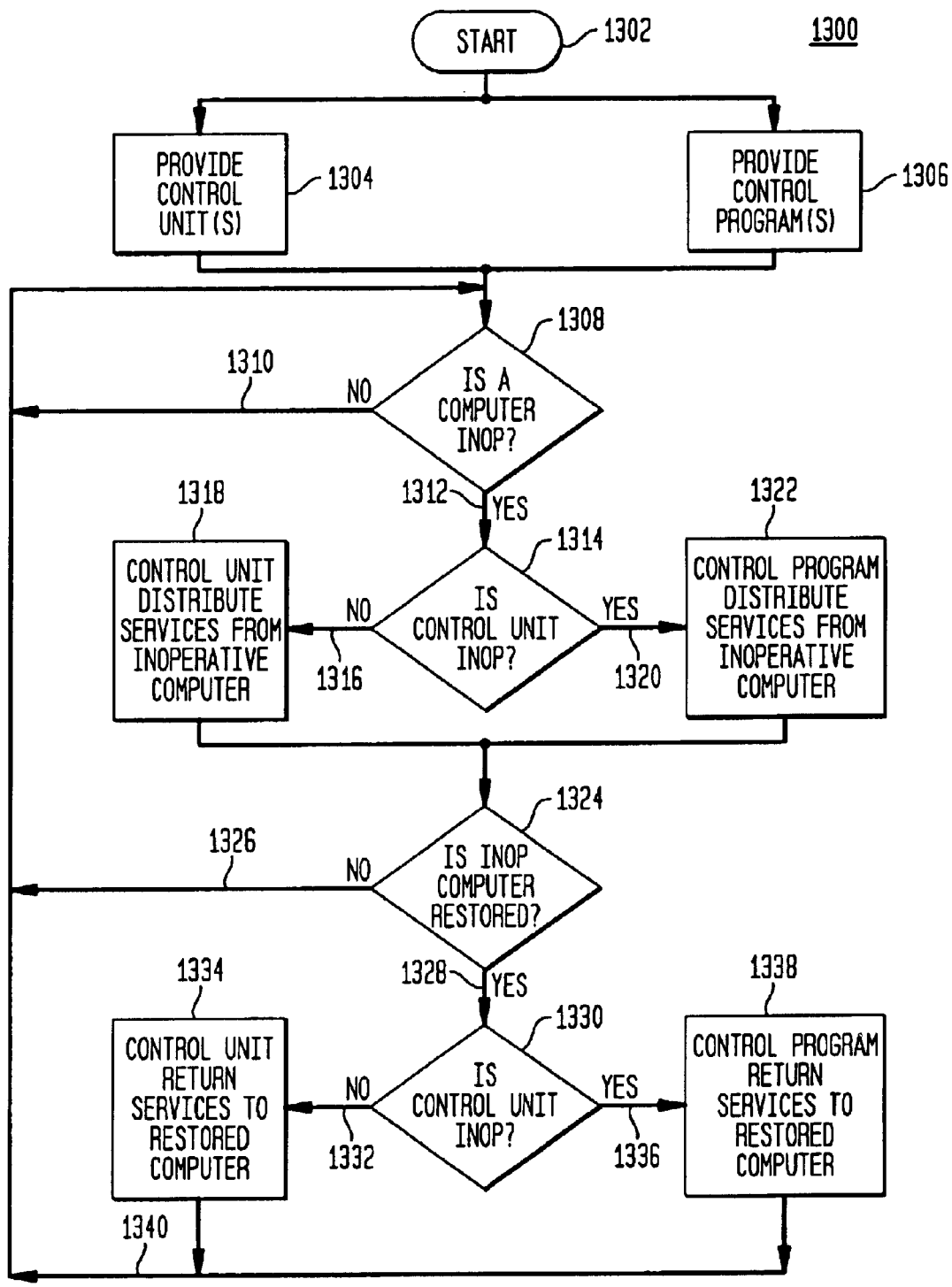
FIG. 13 is a schematic flow diagram illustrating the method of the present invention.

FIG. 13 is a schematic flow diagram illustrating the method of the present invention. In FIG. 13, a method 1300 for effecting recovery of a network begins at a start locus 1302. The network includes a plurality of computing apparatuses; each computing apparatus hosts at least one respective service. The method proceeds from start locus 1302 to, in no particular order, provide at least one control unit that is substantially embodied in hardware as indicated by a block 1304 (at least one hardware watchdog unit), and to provide at least one control program that is substantially embodied in software as indicated by a block 1306 (at least one software watchdog unit). The at least one control unit provided according to block 1304 is coupled with each of the respective computing apparatuses in the network. The at least one control program provided according to block 1306 is embodied in at least one control program distributed among the computing apparatuses in the network.

The method proceeds with a query: "Is a computing apparatus inoperative?" as indicated by a query block 1308. If the response to the query posed by query block 1308 is "No", then the method proceeds according to NO response line 1310 to pose the query according to query block 1308 to another of the computing apparatuses in the network. If the response to the query posed by query block 1308 is "Yes", then there is an identified inoperative computing apparatus in the network and the method proceeds to effect a recovery operation. The recovery operation proceeds according to YES response line 1312 to a query block 1314.

Query block 1314 poses the query "Is the at least one control unit inoperative?". If the response to the query posed by query block 1314 is "No", then the hardware watchdog unit for the network is operative and the method proceeds according to NO response line 1316. The recovery operation is then commenced employing the at least one control unit (i.e., the hardware watchdog unit) to distribute the at least one service hosted by the inoperative computing apparatus among operating computing apparatuses in the network as a distributed service as indicated by a block 1318. If the response to the query posed by query block 1314 is "Yes", then the hardware watchdog unit for the network is inoperative and the method proceeds according to YES response line 1320. The recovery operation is then commenced employing the at least one control program (i.e., the software watchdog unit) to distribute the at least one service hosted by the inoperative computing apparatus among operating computing apparatuses in the network as a distributed service as indicated by a block 1322.

After services are distributed by the hardware watchdog unit (according to block 1318) or the software watchdog unit (according to block 1322), the method proceeds to a query block 1324. Query block 1324 poses the query: "Is the inoperative computing apparatus restored?" If the response to the query posed by query block 1324 is "No", then the distributed services cannot be returned to their original hosting computing apparatus and the method proceeds according to NO response line 1326. The recovery operation is then continued according to blocks 1308, 1314, 1318, 1322, 1324. The repeating of steps according to blocks 1308, 1314, 1318, 1322, 1324 may apply to the inoperative computing apparatus initially identified according to the method step represented by the first pass through block 1308, or the repeated steps may be applied to another computing apparatus in the network. In such manner one may recheck a given inoperative computing apparatus until it has been restored, or one can check all computing apparatuses in a network to determine their operability and periodically recheck an already identified inoperative computing apparatus. Such details of patterns of checking are design decisions made by system designers and system users that are within the scope of the present invention. The method preferably continually rechecks operability of the hardware watchdog unit (i.e., exercises blocks 1314, 1318) to ensure reliable continuity of the network services and to ascertain when the software watchdog unit must take over watchdog responsibilities (i.e., exercising blocks 1314, 1322) for responding to any other computer apparatus failures in the network.

If the response to the query posed by query block 1324 is "Yes" (as it applies to an already identified inoperative computing apparatus), then the affected distributed services can be returned to their original hosting computing apparatus (or redistributed in another arrangement if desired) and the method proceeds according to YES response line 1328 to a query block 1330. Query block 1330 poses the query: "Is the at least one control unit inoperative?". If the response to the query posed by query block 1330 is "No", then the hardware watchdog unit for the network is operative and the method proceeds according to NO response line 1332. The recovery operation is then completed by employing the at least one control unit (i.e., the hardware watchdog unit) to return the distributed services to their original hosting computing apparatus (now operational) as indicated by a block 1334. If desired, hosting arangements can be redistributed in another arrangement. If the response to the query posed by query block 1330 is "Yes", then the hardware watchdog unit for the network is inoperative and the method proceeds according to YES response line 1336. The recovery operation is then completed by employing the at least one control program (i.e., the software watchdog unit) to return the distributed services to their original hosting computing apparatus (now operational) as indicated by a block 1338. If desired, hosting arangements can be redistributed in another arrangement.

In such manner, hardware watchdog unit(s) and software watchdog unit(s) cooperate to effect a recovery operation— that is a continuity arrangement to distribute services among operating computing apparatuses in the network (blocks 1318, 1322) and a restoration arrangement to return distributed services to their original (or newly designated) hosting computing apparatus when the original hosting apparatus is returned to operation (blocks 1334, 1338). Upon concluding the recovery operation, the method preferably returns via return line 1340 to block 1308 and continues checking operability of computing apparatuses in the network.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A system for controlling operation of a plurality of computing apparatuses in a network; each respective computing apparatus of said plurality of computing apparatuses hosting at least one respective service; the system responding to any said respective computing apparatus being inoperative by effecting a continuity operation; said continuity operation including distributing said at least one service hosted by said inoperative computing apparatus among operating said respective computing apparatuses in said network; the system comprising:

(a) at least one watchdog control unit; said at least one control unit being substantially embodied in hardware; said at least one control unit being coupled with each said respective computing apparatus in said network; and (b) at least one watchdog control program; each respective control program of said at least one control program being substantially embodied in software; said at least one control program being distributed among at least one of said respective computing apparatuses in said network;

wherein said at least one control unit effects said continuity operation when a respective said computing apparatus becomes an inoperative computing apparatus; said at least one control program backing up said at least one control unit; said at least one control program effecting said continuity operation when said at least one unit cannot effect said continuity operation.

2. A system for controlling operation of a plurality of computing apparatuses in a network as recited in claim 1 wherein said at least one control unit is one control unit; said one control unit being a substantially autonomous computing unit in communication with said plurality of computing apparatuses; said control unit effecting said continuity operation when a respective said computing apparatus becomes an inoperative computing apparatus; said at least one control program backing up said control unit; said at least one control program effecting said continuity operation when said control unit cannot effect said continuity operation.

3. A system for controlling operation of a plurality of computing apparatuses in a network as recited in claim 2 wherein said at least one control program is a plurality of control programs; each said respective computing apparatus hosting at least one respective control program of said plurality of control programs.

4. A system for controlling operation of a plurality of computing apparatuses in a network as recited in claim 1 wherein said at least one control program is a plurality of control programs; each said respective computing apparatus hosting at least one respective control program of said plurality of control programs.

5. A system for controlling operation of a plurality of computing apparatuses in a network as recited in claim 1 wherein one of said at least one control unit and said at least one control program effects a recovery operation when said inoperative computing apparatus becomes an operative computing apparatus; said recovery operation effecting returning said at least one respective service to the respective computing apparatus from which it was distributed when effecting said continuity operation.

6. A system for controlling operation of a plurality of computing apparatuses in a network as recited in claim 5 wherein said at least one control unit effects said recovery operation when said inoperative computing apparatus becomes an operative computing apparatus; said at least one control program backing up said at least one control unit; said at least one control program effecting said recovery operation when said at least one control unit cannot effect said recovery operation.

7. A system for controlling operation of a plurality of computing apparatuses in a network as recited in claim 6 wherein said at least one control program is a plurality of control programs; each said respective computing apparatus hosting at least one respective control program of said plurality of control programs.

8. A system for controlling operation of a plurality of computing apparatuses in a network as recited in claim 5 wherein said at least one control unit is one control unit; said one control unit being a substantially autonomous computing unit in communication with said plurality of computing apparatuses; said control unit effecting said recovery operation when said inoperative computing apparatus becomes an operative computing apparatus; said at least one control program backing up said control unit; said at least one control program effecting said recovery operation when said control unit cannot effect said recovery operation.

9. A system for controlling operation of a plurality of computing apparatuses in a network as recited in claim 8 wherein said at least one control program is a plurality of control programs; each said respective computing apparatus hosting at least one respective control program of said plurality of control programs.

10. A system for effecting recovery of a network; said network including a plurality of computing apparatuses; each respective computing apparatus of said plurality of computing apparatuses hosting at least one respective service; the system comprising:
   (a) at least one watchdog control unit; said at least one control unit being substantially embodied in hardware; said at least one control unit being coupled with each said respective computing apparatus; and
   (b) at least one watchdog control program; each respective control program of said at least one control program being substantially embodied in software; said at least one control program being distributed among at least one of said respective computing apparatuses;

the system responding to a respective said computing apparatus becoming an inoperative computing apparatus by effecting a recovery operation; said recovery operation including distributing said at least one service hosted by said inoperative computing apparatus as at least one distributed service among operating said respective computing apparatuses and returning said at least one distributed service to said inoperative computing apparatus after said inoperative computing apparatus becomes operative; said at least one control unit and said at least one control program cooperating to effect said recovery operation, wherein said cooperating is effected by said at least one control unit effecting said recovery operation; said at least one control program backing up said at least one control unit; said at least one control program effecting said recovery operation when said at least one control unit cannot effect said recovery operation.

11. A system for effecting recovery of a network as recited in claim 10 wherein said at least one control unit is one control unit; said one control unit being a substantially autonomous computing unit in communication with said plurality of computing apparatuses; said cooperating being effected by said one control unit effecting said recovery operation; said at least one control program backing up said one control unit; said at least one control program effecting said recovery operation when said one control unit cannot effect said recovery operation.

12. A system for effecting recovery of a network as recited in claim 11 wherein said at least one control program is a plurality of control programs; each said respective computing apparatus hosting at least one respective control program of said plurality of control programs.

13. A system for effecting recovery of a network as recited in claim 10 wherein said at least one control program is a plurality of control programs; each said respective computing apparatus hosting at least one respective control program of said plurality of control programs.

14. A method for effecting recovery of a network; said network including a plurality of computing apparatuses; each respective computing apparatus of said plurality of computing apparatuses hosting at least one respective service; the method comprising the steps of:
   (a) in no particular order:
       (1) providing at least one watchdog control unit; said at least one control unit being substantially embodied in hardware; said at least one control unit being coupled with each said respective computing apparatus; and
       (2) providing at least one watchdog control program; each respective control program of said at least one control program being substantially embodied in software; said at least one control program being distributed among at least one of said respective computing apparatuses;
   (b) operating the system to respond to a respective said computing apparatus becoming an inoperative computing apparatus by effecting a recovery operation; said recovery operation including the steps of:
(1) distributing said at least one service hosted by said inoperative computing apparatus as at least one distributed service among operating said respective computing apparatuses; and
(2) after said inoperative computing apparatus becomes operative, returning said at least one distributed service to said previously inoperative computing apparatus; said at least one control unit and said at least one control program cooperating to effect said recovery operation, wherein said cooperating is effected by said at least one control unit effecting said recovery operation; said at least one control program backing up said at least one control unit; said at least one control program effecting said recovery operation when said at least one control unit cannot effect said recovery operation.

15. A method for effecting recovery of a network as recited in claim 14 wherein said at least one control unit is one control unit; said one control unit being a substantially autonomous computing unit in communication with said plurality of computing apparatuses; said cooperating being effected by said one control unit effecting said recovery operation; said at least one control program backing up said one control unit; said at least one control program effecting said recovery operation when said one control unit cannot effect said recovery operation.

16. A system for effecting recovery of a network as recited in claim 15 wherein said at least one control program is a plurality of control programs; each said respective computing apparatus hosting at least one respective control program of said plurality of control programs.

17. A method for effecting recovery of a network as recited in claim 14 wherein said at least one control program is a plurality of control programs; each said respective computing apparatus hosting at least one respective control program of said plurality of control programs.

* * * * *